United States Patent
Harada et al.

(10) Patent No.: US 7,579,751 B2
(45) Date of Patent: Aug. 25, 2009

(54) OPTICAL MEMBER DRIVING DEVICE

(75) Inventors: Manabu Harada, Kaizuka (JP); Yasuhiro Okamoto, Tondabayashi (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/586,938

(22) Filed: Oct. 26, 2006

(65) Prior Publication Data

US 2007/0097524 A1   May 3, 2007

(30) Foreign Application Priority Data

Oct. 28, 2005   (JP) ............................... 2005-313785

(51) Int. Cl.
    *H02N 2/00*   (2006.01)
(52) U.S. Cl. ................................. 310/323.17
(58) Field of Classification Search ..............................
        310/323.01–323.04, 323.15, 323.17, 328
    See application file for complete search history.

(56) References Cited

U.S. PATENT DOCUMENTS

| 5,034,646 | A | * | 7/1991 | Shirasaki ............... 310/323.11 |
| 5,986,826 | A | | 11/1999 | Kosaka et al. |
| 6,091,179 | A | * | 7/2000 | Tobe et al. .................. 310/328 |
| 6,111,336 | A | * | 8/2000 | Yoshida et al. .............. 310/328 |
| 6,803,699 | B2 | | 10/2004 | Yuasa et al. |
| 2003/0222538 | A1 | * | 12/2003 | Hata et al. ................... 310/328 |
| 2005/0073755 | A1 | * | 4/2005 | Takeo et al. .................. 359/819 |
| 2006/0220497 | A1 | * | 10/2006 | Okamoto et al. ............ 310/328 |
| 2007/0096601 | A1 | * | 5/2007 | Sueyoshi et al. ............ 310/328 |

FOREIGN PATENT DOCUMENTS

| EP | 0 675 589 A1 | 10/1995 |
| JP | 2003-123275 | 4/2003 |
| JP | 2004-080964 | 3/2004 |

OTHER PUBLICATIONS

European Search Report in European Patent Application No. EP 06 02 2530.7, dated Feb. 6, 2007, 2 pages.

* cited by examiner

*Primary Examiner*—Thomas M Dougherty
(74) *Attorney, Agent, or Firm*—Brinks Hofer Gilson & Lione

(57) ABSTRACT

An optical member driving device having a movable member formed integrally with a frame member holding an optical member, without requiring a reinforcement of any abutting regions on the driving friction member is comprising a driving friction member capable of a reciprocation in an axial direction thereof, a movable member formed integrally with a frame member holding an optical member which engages frictionally with the driving friction member, wherein the movable member is made from fiber reinforced polyphenylene sulfide formed with an injection molding process, and an engaging surface of the movable member abutting on the driving friction member is processed so as to remove some material after the injection molding process.

8 Claims, 3 Drawing Sheets

OPTICAL MEMBER DRIVING DEVICE

RELATED APPLICATION

This application is based on a patent application No. 2005-313785 filed in Japan, the content of which is hereby incorporated by reference.

BACKGROUND OF THE INVENTION

The present invention relates to an optical member driving device which drives a lens or the like.

In the U.S. Pat. No. 5,986,826, it is described an optical member driving device having a piezoelectric element as a power source and a movable member frictionally engaging with a driving friction member which is reciprocated in an axial direction of the driving friction member, wherein the movable member is formed integrally with a frame member holding the lens.

Furthermore, an another example of the driving device in which the driving friction member is reciprocated in the axial direction by a piezoelectric element is described for instance, in Japanese unexamined patent publication No. 2004-80964.

Conventionally, the movable member is formed by an injection molding process and dose not have enough hardness of an engaging surface abutting on the driving friction member, therefore the movable member should be reinforced by placing the metal member or coating some metal onto the engaging surface as described in the U.S. Pat. No. 5,986,956.

SUMMERY OF THE INVENTION

An object of the present invention is to provide an optical member driving device having a movable member formed integrally with a frame member holding an optical member, without requiring a reinforcement of any abutting regions on the driving friction member.

In order to achieve the object of the present invention, there is provided an optical member driving device having a driving friction member capable of a reciprocation in an axial direction thereof and a movable member which is formed integrally with a frame member holding an optical member and which engages frictionally with the driving friction member, wherein the movable member is made from polyphenylene sulfide.

According to this construction, even the frame member is formed integrally with the movable member, the polyphenylene sulfide has enough hardness and stiffness, therefore the engaging surface of the movable member abutting on the driving friction member dose not require any reinforcement.

Moreover, in the optical member driving device of the present invention, at least one of carbon fiber, grass fiber, carbon whisker and potassium titanate whisker may be dispersed in the polyphenylene sulfide composing the movable member.

According to this construction, a high hardness and a high stiffness are provided for the polyphenylene sulfide by the fiber reinforcement.

Moreover, in the optical member driving device of the present invention, the movable member may be formed by an injection molding process and an engaging surface of the movable member abutting on the driving friction member may be processed so as to remove some material after the injection molding process.

According to this construction, the engaging surface of the movable member is finished by machining process, therefore the engaging surface has a high dimensional accuracy compared to that in the case where it is reinforced by a separate element. While it is difficult for the fibers to spread into a surface layer of the movable member during the injection molding process using the fiber reinforced resin, the removal of the surface layer of the movable member provide a high hardness and a high stiffness for the engaging surface abutting on the driving friction member.

As described above the optical member driving device according to the present invention includes the movable member formed integrally with the frame member from polyphenylene sulfide, so as to provide a high stiffness for the movable member and a high hardness for the engaging surface abutting on the driving friction member, therefore any reinforcement for the movable member is not required.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE PREFERRED EMBODIMENT

Figure 1:
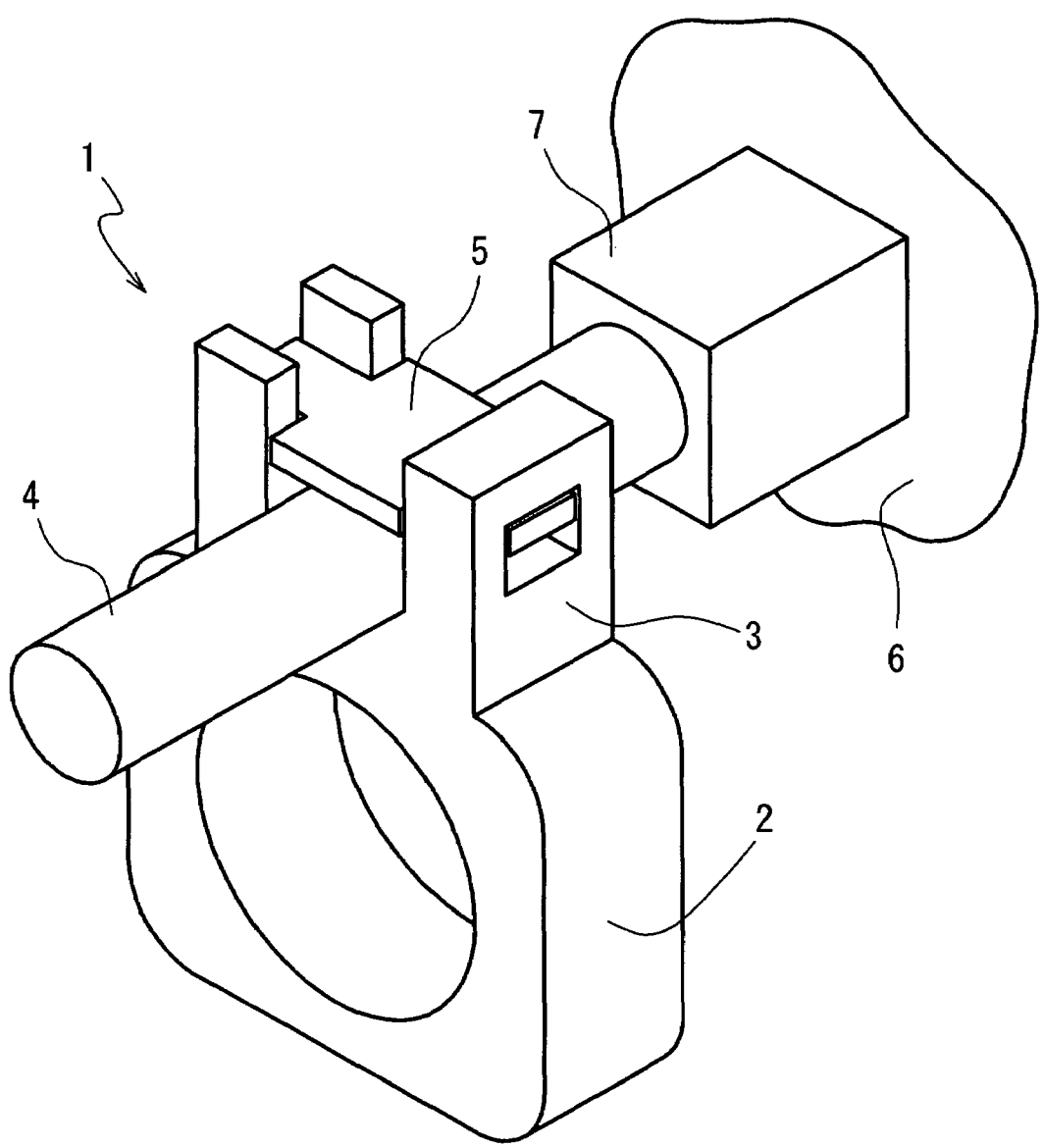
FIG. 1 is a perspective view of an optical member driving device as one embodiment according to the present invention.

FIG. 1 shows an optical member driving device 1 of one embodiment according to the present invention. The optical member driving device 1 has a movable member 3 which is formed integrally with a frame member 2 holding a lens not shown in the drawings, a cylindrical driving friction member 4 on which a movable member 3 engages and a biasing member 5 pressing the driving friction member 4 against the movable member 3 through a spring not shown in the drawings. One end of the driving friction member 4 is fixed to an extensible piezoelectric element 7 fixed on an immovable base 6, so that the driving friction member 4 moves in an axial direction due to the expansion and contraction of the piezoelectric element 7.

In the optical member driving device 1, when the driving friction member 4 moves slowly in the axial direction, the movable member 3 moves with the driving friction member 4 through a frictional force against the driving friction member 4, but when the driving friction member 4 moves quickly in the axial direction, the movable member 3 tends to stay the present position due to inertial force exerting thereon so as to slide on the driving friction member 4 with overcoming the frictional force. The optical member driving device 1 can position the movable member 3 and in turn the frame member 2 holding the lens by controlling the speed of the reciprocation of the driving friction member 4.

Figure 2:
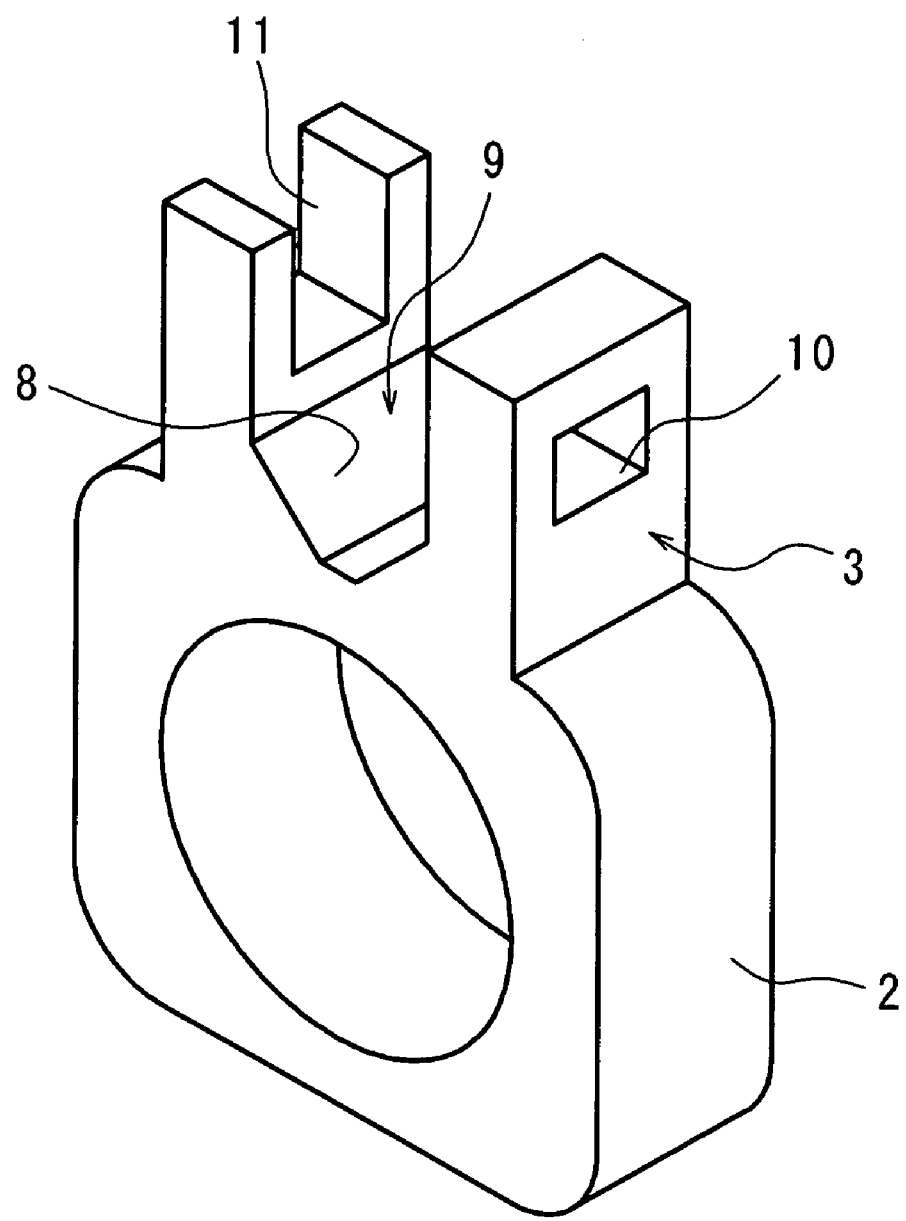
FIG. 2 is a perspective view of a movable member in FIG. 1.

As shown in FIG. 2, the movable member 3 is provided with a engaging groove 9 which is formed into a "V" shape with an engaging surface 8 abutting on the driving friction member 4 and which receives the driving friction member 4, a retaining hole 10 receiving one end of the biasing member 5 and a retaining groove 11 receiving another end of the biasing member 5.

The movable member 3 is formed by an injection molding process of polyphenylene sulfide in which carbon fibers are dispersed, for instance.

Figure 3:
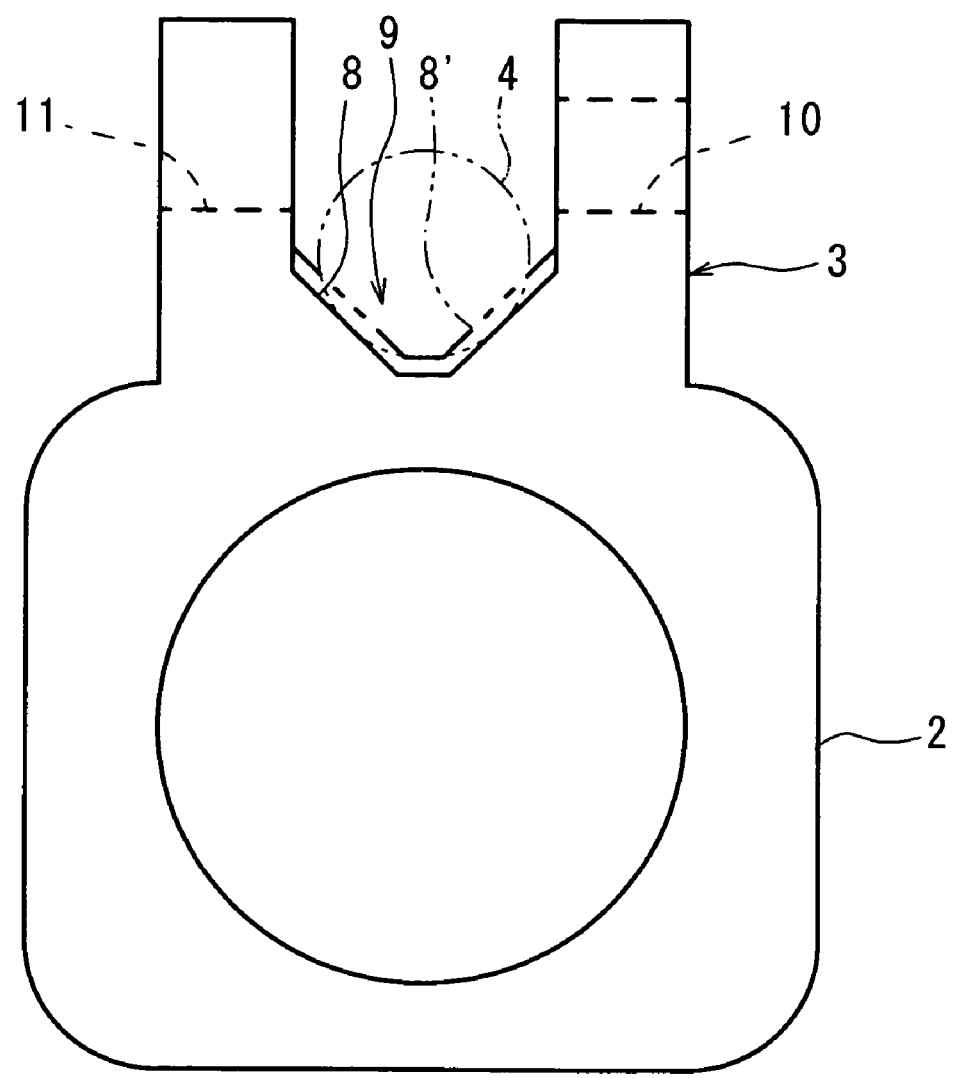
FIG. 3 is a front view of the movable member in FIG. 1.

FIG. 3 shows the shape of the engaging groove 9 of the movable member 3 at the injection molding process with a two-doted chain line and the shape of the engaging groove 9 after the machining process with a solid line. As shown in the figure, the engaging surface 8 of the movable member 3 is formed by removing a surface layer 8' with a machining process.

Subsequently, advantages of the optical member driving device 1 having the above stated construction will be described below.

The movable member 3 of the optical member driving device 1 is made from fiber reinforced resin, such as polyphenylene sulfide reinforced with carbon fibers, which has a high hardness, a high stiffness and a machinability. Therefore, the engaging groove 9 can be finished by the machining process so as to provide a high dimensional accuracy for the optimal frictional engagement between the movable member 3 and the driving friction member 4.

Moreover, during an injection molding process of a resin including the dispersed fibers, generally, it is difficult for the fibers to spread into the surface layer of a molded work. However, the engaging surface 8 of the movable member 3, where particularly requires a high hardness, is formed by removing the surface layer 8' with the machining process, therefore the engaging surface 8 of the movable member 3 is composed of fiber-reinforced polyphenylene sulfide resin including enough fibers and having a high hardness.

Consequently, the movable member 3 can be achieved ideally frictional engagement between the movable member 3 and the driving friction member 4 so as to stabilize the propelling condition of the movable member 3, therefore the optical member driving device 1 has high positioning accuracy.

Moreover, the movable member 3 is molded integrally with the frame member 2 and dose not require any reinforcements of the engaging surface 8, thereby the movable member 3 can be reduced in cost and a shorter lead time of the movable member 3 is also allowed due to less producing processes.

The present invention can be applied to a camera, a device for optical disc such as DVD and a lens driving device for an endoscope or the like.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical member driving device comprising:
   a driving friction member capable of a reciprocation in an axial direction thereof;
   a movable member formed integrally with a frame member holding an optical member and which engages frictionally with said driving friction member, wherein said movable member is made from polyphenylene sulfide and is formed by an injection molding process, and an engaging surface of said movable member abutting on said driving friction member and which provides a high dimensional accuracy between said optical member and said driving friction member, said engaging surface is formed by removing a surface layer of said movable member by a machining process after said injection molding process.

2. An optical member driving device as claimed in claim 1, wherein at least one of carbon fiber, grass fiber, carbon whisker and potassium titanate whisker are dispersed in said polyphenylene sulfide composing said movable member.

3. An optical member driving device as claimed in claim 1, wherein potassium titanate whisker is dispersed in said polyphenylene sulfide composing said movable member.

4. An optical member driving device comprising:
   an extensible piezoelectric element;
   a driving friction member fixed to one end of said piezoelectric element and capable of a reciprocation in an axial direction thereof by an extension and contraction of said piezoelectric element;
   a movable member formed integrally with a frame member holding an optical member and which engages frictionally with said driving friction member, wherein said movable member is made from polyphenylene sulfide and is formed by an injection molding process, and an engaging surface of said movable member abutting on said driving friction member and which provides a high dimensional accuracy between said optical member and said driving friction member, said engaging surface is formed by removing a surface layer of said movable member by a machining process after said injection molding process.

5. An optical member driving device as claimed in claim 4, wherein at least one of carbon fiber, grass fiber, carbon whisker and potassium titanate whisker are dispersed in said polyphenylene sulfide composing said movable member.

6. An optical member driving device as claimed in claim 4, wherein potassium titanate whisker is dispersed in said polyphenylene sulfide composing said movable member.

7. A method of producing an optical member driving device that comprises a driving friction member capable of a reciprocation in an axial direction thereof and a movable member formed integrally with a frame member holding an optical member and which engages frictionally with said driving friction member, the method comprising:
   performing an injection molding process so as to form said movable member from polyphenylene sulfide; and
   subsequent to said performing said injection molding process, performing a machining process to remove a surface layer of said movable member for forming an engaging surface of said movable member abutting on said driving friction member.

8. The method of claim 7, wherein at least one of carbon fiber, grass fiber, carbon whisker and potassium titanate whisker are dispersed in said polyphenylene sulfide during said performing said injection molding process.

* * * * *